Figure 1:
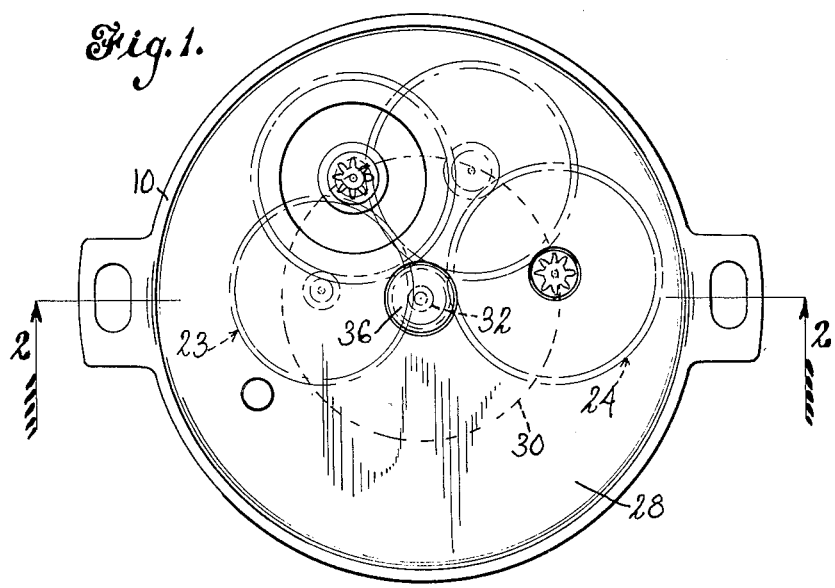

June 6, 1961  F. LUX  2,987,638
BEARING CONSTRUCTION FOR MOTORS
Filed Aug. 26, 1954  2 Sheets-Sheet 1

INVENTOR
Frederick Lux
BY Rockwell & Bartholow
ATTORNEYS

June 6, 1961  F. LUX  2,987,638
BEARING CONSTRUCTION FOR MOTORS
Filed Aug. 26, 1954  2 Sheets-Sheet 2

INVENTOR
Frederick Lux
BY
ATTORNEYS

United States Patent Office 2,987,638
Patented June 6, 1961

2,987,638
BEARING CONSTRUCTION FOR MOTORS
Frederick Lux, Waterbury, Conn., assignor to The Lux Clock Manufacturing Company, Inc., Waterbury, Conn., a corporation of Connecticut
Filed Aug. 26, 1954, Ser. No. 452,395
3 Claims. (Cl. 310—90)

This invention relates to bearings for electric motors or the like and more particularly to a bearing for a small motor having a very light torque such as synchronous clock motors of small size.

The shaft torque of motors of this character is of very low magnitude as is evidenced by the fact that the output shaft, for example that of the minute hand of a clock, may have a torque no greater than a few inch ounces. When it is considered that the motor which drives this shaft has a speed of not less than 450 r.p.m., it will be apparent that the torque of the motor shaft is extremely small being $\frac{1}{450}$ of the torque of the output shaft. For this reason frictional losses upon the motor shaft must be maintained at a very low figure, and on account of the high speed of the motor shaft the bearings of this shaft, usually of orthodox design, must be very accurately made with extremely close fits between the motor shaft and its bearings.

A further factor which requires accurate manufacture of the bearings arises from the fact that vibratory influences due to the energization of the field of the motor by an alternating current are present and act upon the rotor, and there is also the possibility in many cases of an out-of-balance condition of the rotor itself. These factors all have an effect upon the bearings which requires extreme accuracy if the motor is to run smoothly and quietly and have a long life.

In addition lubrication presents a problem in motors of this character since an oil of relatively low viscosity is desirable in order that the torque required to shear the oil while the shaft is rotating be kept at a minimum. However, oils of light viscosity have a tendency to creep and to be dissipated so that the life of such a lubricant is relatively short. If the oil viscosity is increased to avoid oil losses, torque is sacrificed as a greater portion of the available torque is required to shear the oil.

Another factor which must be taken into consideration in the manufacture of bearings for motors of this type is the fact that a clock must run for a great many years so that the loss of lubricant or its deterioration must be kept to a minimum. This long service required of a clock is also an important factor in that, if the motor rotates at a relatively high speed, it will be required to turn a great many revolutions over the life of the device and consequently bearing wear must be prevented. For example, if the speed of the motor is as slow as 450 revolutions per minute, the motor shaft must make 648,000 revolutions in 24 hours or 236,520,000 revolutions per year, and such a condition ordinarily requires careful attention to bearings and lubrication or both.

It is contemplated by the present invention to provide shaft bearings for a small synchronous motor which may be economically made, capable of giving extremely long service, and operate with little or no lubrication. To this end the ends of the motor shaft are of conical shape. However, the extreme end of the shaft, instead of terminating in a sharp point, terminates in a spherical surface having a relatively small radius. It has been found that the end of a shaft so formed when employed, or seated, in a bearing of a motor softer than the shaft such as nylon, for example, will displace rather than wear a small depression into such surface within a short time. This "wearing in" of a small depression in the surface of the bearing will increase the bearing area so that a point is soon reached where further displacement of the bearing material will be resisted and thereafter the shaft will run on the spherical bearing surface so formed.

As illustrated herein, the seat in the bearing which receives the shaft is of conical shape having, however, an included angle slightly larger than that of the end of the shaft so that the contact between the shaft end and the bearing will be at the spherical end of the shaft and not along the sides of the cone. Moreover, the shaft bearings or at least one thereof is resiliently mounted so that a small pressure will be exerted in the direction of the axis of the shaft. This pressure is very slight so that it will not impose any such frictional load upon the shaft as to absorb a significant amount of the shaft torque, and it will only act through such a distance as to take up any seating wear as the conical end of the shaft seats itself in the bearing. Under these conditions when the bearing area at the end of the shaft is of sufficient size to resist any further displacement, no further change in the positions of the bearing and shaft occurs irrespective of the length of time that the spherical surface revolves upon its seat.

By reason of the extremely small wear occurring between the highly polished spherical surface provided on the end of the shaft and the bearing member made of a suitable material such as nylon, for example, extremely long life of such a bearing may be expected, and by reason of the low coefficient of friction existing between the contacting surfaces of the bearing and shaft and the relatively small areas of the contacting surfaces, lubrication will not be required.

One object of the present invention is to provide a small electric motor such, for example, as a synchronous motor for an electric clock with a bearing construction which will have a low coefficient of friction and, therefore, relatively long life.

A further object of the invention is to provide a bearing construction for a motor of the character described such that there will be little, if any, wear between the bearing and the shaft after the "break-in" period thereof and, therefore, the motor will continue to run without noise over a long period of time.

A still further object of the invention is to provide a bearing construction for an electric motor of the class described such that little or no lubrication will be required between the shaft and its bearing seat while at the same time the motor will run quietly over a long period of time without bearing wear.

A still further object of the invention is to provide a bearing construction for the shaft of a low torque electric motor wherein the bearing seat for the end of the motor shaft will be made of a softer material than that of the shaft itself, the shaft having a cone-shaped end portion terminating in a spherical surface and providing light initial pressure on the end of the bearing in a direction axially of the shaft so that the shaft will displace the material of the bearing to seat itself therein and thereafter continue to run smoothly without further displacement of material and without lubrication over a long period of time.

To these and other ends the invention consists in the novel features and combinations of parts to be hereinafter described and claimed.

Figure 2:
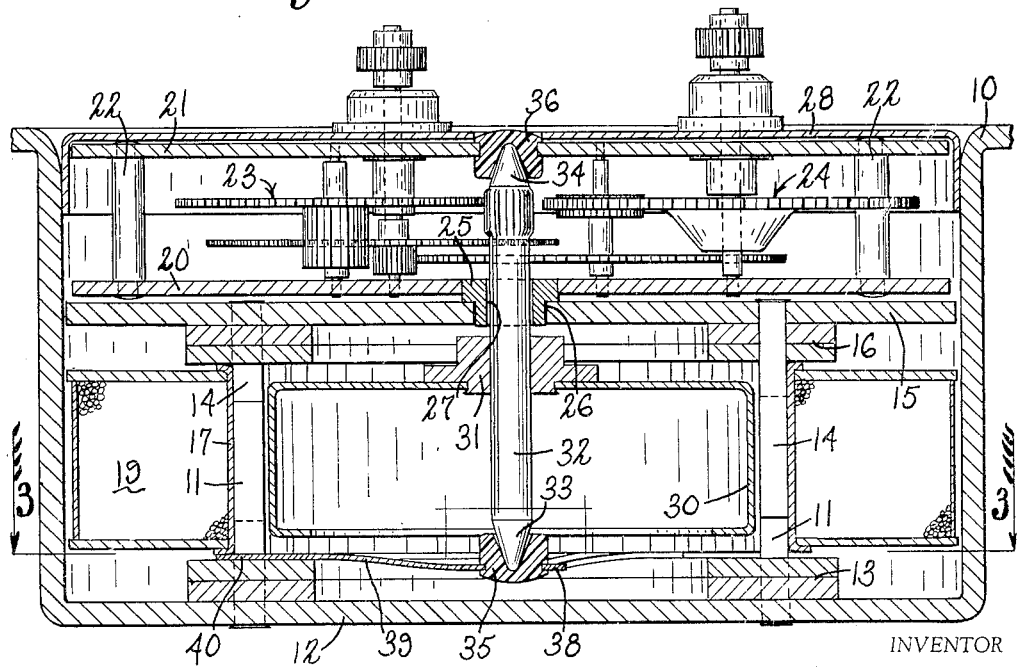
Figure 3:
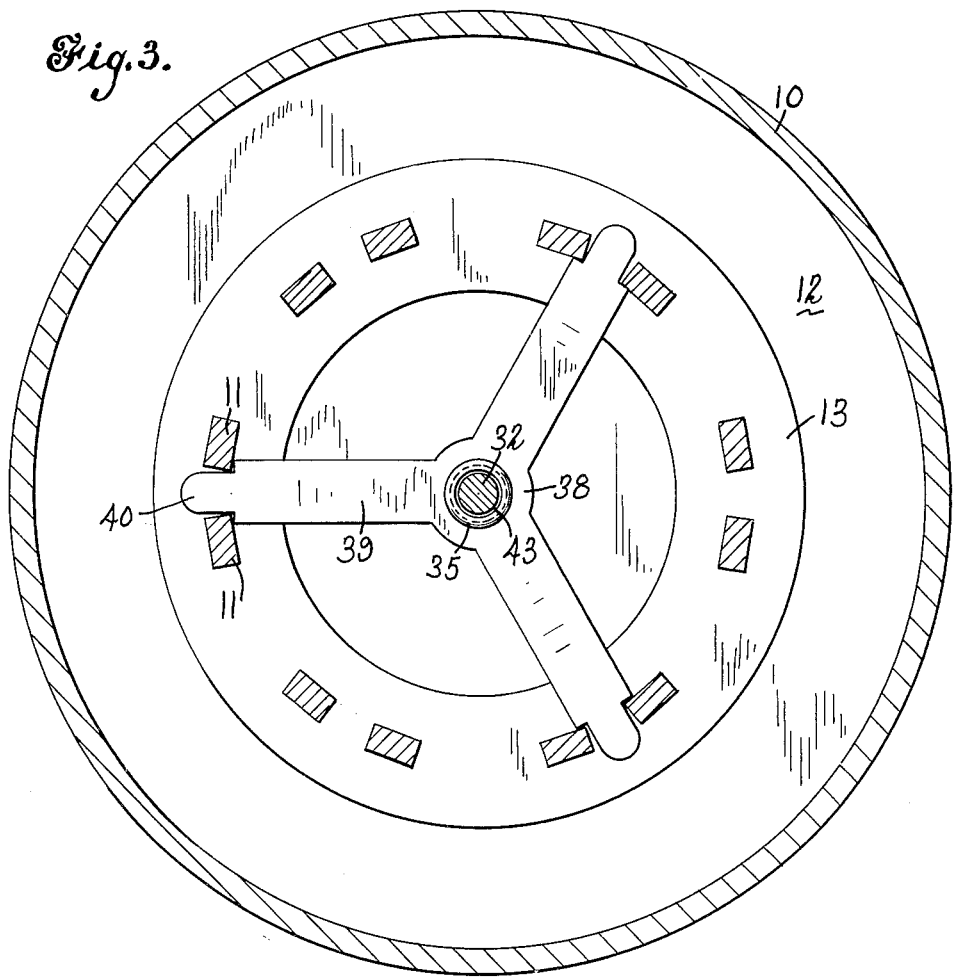
Figure 4:
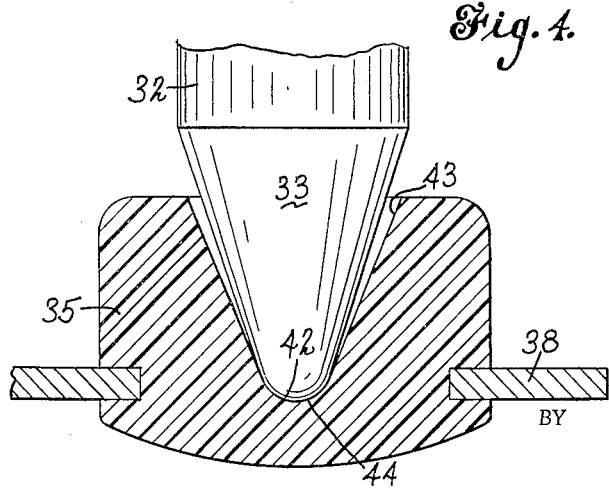

In the accompanying drawings:
FIG. 1 is a front elevational view of a small electric motor such as a clock motor, for example, embodying my invention;
FIG. 2 is a sectional view thereof on line 2—2 of FIG. 1;
FIG. 3 is a sectional view on line 3—3 of FIG. 2; and
FIG. 4 is an enlarged sectional view through the bearing at one end of the motor shaft.

To illustrate a preferred embodiment of my invention, I have shown in the drawings a synchronous electric motor which comprises a cup-shaped casing 10 having a series of pole pieces 11 projecting upwardly from the bottom member 12 of the cup. These pole pieces are arranged in pairs, as shown in FIG. 3 of the drawings, and shading disks 13 are provided through which the pole pieces extend.

Cooperating pole pieces 14, likewise arranged in pairs, are secured to and extend downwardly from a plate 15, the pole pieces 14 lying between the upwardly projecting pole pieces 11. Shading disks 16 are also provided below the plate 15 and the upper pole pieces 14, and the plate 15 is held in spaced relation to the bottom 12 of the cup-shaped casing by a sleeve 17, which is a part of the field coil of the motor.

The field coil of the motor is shown at 19 and surrounds the pole pieces to energize them and effect rotation of the rotor. So far as the foregoing structure is concerned, it is substantially like that shown in my prior Patent No. 2,266,878, dated December 23, 1941.

Mounted in the casing 10 above the plate 15 is a gear frame comprising two plate-like frame members 20 and 21 held together in spaced relation by posts 22 and carrying a train of gears designated generally at 23 and 24, a detailed description of these gears being unnecessary so far as the present invention is concerned.

Secured to the member 20 is a shouldered collar 25, the lower reduced portion of which is seated in an opening 26 in the plate 15 so that the gear frame rests against the latter. The collar 25 is provided with a central opening 27 through which the shaft of the motor loosely extends as will be hereinafter described. The gear frame is held within the casing by a cover 28 which may be frictionally secured in place within the cup-shaped casing 10 so that the parts are held in assembled position.

Rotatably mounted within the cage formed by the pole members 11 and 14 is a rotor 30 which in the present instance is of hollow cylindrical form made of metal of a suitable type. This rotor is secured to a collar 31 which is in turn secured to the rotor shaft 32. As shown in FIG. 2, this shaft is provided with conical end portions 33 and 34 seated in bearings 35 and 36. These bearings are of similar form as will be hereinafter described and are preferably made of nylon or some similar material which will have low friction with the ends of the shaft 32 and which will require little or no lubrication and at the same time be wear resistant. As will be apparent, the motor shaft 32 passes through the opening 27 of the collar 25 with sufficient clearance so that it does not touch the wall of the opening.

The upper bearing 36, as shown in FIG. 2, is rigidly mounted in the frame member 21 of the gear unit so that it will be fixed in its position. The lower bearing 35 is resiliently mounted so as to exert a slight pressure in an axial direction on the end of the motor shaft 32. To this end the bearing 35 is carried by a spider 38 having arms 39 (FIG. 3) which extend radially outwardly and are provided with reduced ends 40 projecting outwardly between adjacent pairs of the poles 11, this spider being held in place by the coil 19. The arms 39 are resilient and are so shaped as to urge the bearing 35 toward the shaft 32 under light pressure.

As shown more especially in FIG. 4, the conical ends of the shaft 32 are not extended to a point but are provided at the extreme ends with a spherical surface 42, this surface, however, having a relatively small radius as compared to that of the shaft so that the relative speed between the contacting surfaces of the shaft and bearing will be very small. Similarly the conical seats 43 in each of the bearing members 35 and 36 are not extended to an absolute point but are also provided with a spherical surface 44 of relatively small radius and, as previously stated, the included angle of each conical bearing seat will be somewhat greater than that of the conical shaft ends so that the contact between the two members will be that between the spherical ends of the shaft and the spherical seats in the bearing members, thus providing for contact over a spherical surface of very small radius.

In the present case the material of the shaft, which is high-carbon steel, is harder than that of the bearing members, which is nylon. However, the reverse may be true, and the metal of the shaft may be softer than that of the bearing with a like result. In any event, however, the materials of the shaft and bearing must be such that there is a very low coefficient of friction between the two and when the bearing surface is very small the result will be a substantially frictionless operation so that the bearing will operate without lubrication and will be noiseless.

As has been described, the resilient spider 38 will exert a light pressure axially of the shaft 32. This pressure will be sufficient to cause the shaft to displace a slight amount of material in the bearing and seat itself therein until the bearing area is sufficient so that further displacement will be resisted. The bearing under the light pressure of the resilient spider will take up any play which might otherwise be due to this initial enlargement of the seat of the shaft upon the bearing member and, if any slight wear occurs throughout the life of the motor, will continue to take up such wear and thus provide for continued efficient operation of the motor.

In the case of synchronous motor, the shaft of the motor carries the rotor, and the rotor should be positioned in its optimum position relatively to the magnetic field of the current by which it is activated. This must be taken into consideration in determining the optimum position of the shaft itself.

Further, the rotor should be so supported that its axis is very accurately positioned and prevented from varying the optimum position even by a small amount. This requirement imposes radial bearing loads upon the shaft of the rotor, and in the present instance such loads are borne by the side thrust of the spherical end of the shaft against its mating spherical seat. Theoretically, there would be a tendency to "cam" the resiliently mounted bearing member axially away from the spherical end of the shaft, but in the case of motors of the type of the present application, the radial load is of such small magnitude that any such displacement which might take place is negligible.

While I have shown and described a preferred embodiment of my invention, it will be understood that it is not to be limited to all of the details shown, but is capable of modification and variation within the spirit of the invention and within the scope of the claims.

What I claim is:

1. An electric motor having a field structure including a plurality of spaced pole pieces arranged in a circular series, a shading disk arranged at the base of certain of said pole pieces, a rotor including a shaft, a bearing member at each end of the shaft, one of said bearing members being fixed, a spider supporting the other of said bearing members, said spider having resilient legs extending radially and outwardly from the bearing member, the ends of which are supported upon said shading disk, each of said bearing members having a seat having a generally conical side wall and a rounded bottom surface, each of the ends of said shaft being of cone-shaped form but terminating in a rounded surface of generally spherical form and of relatively small radius compared to that of the shaft to abut against the complementally rounded bottom surface of the seat of the bearing member, and the resilient arms of said spider urging the bearing member supported thereby toward the other bearing in a direction axially of the shaft.

2. A low torque motor having a shaft and a bearing member at each end thereof, each of said bearing members having a seat having a generally conical side wall and a rounded bottom surface, each of the ends of said shaft being of cone-shaped form but terminating in a rounded surface of generally spherical form and of a relatively small radius compared to that of the shaft, one of said bearing members being fixed, a resilient spider supporting the other bearing member and urging it toward the first member in a direction axially of the shaft, said spider comprising a central portion to which the bearing is secured and arms projecting outwardly and radially from said central portion, means engaging the ends of said arms to support the spider, the spherical surface of the shaft making a close fit with the conical seat of the bearing at the bottom of said seat, and the included angle of the conical seat in the bearing member being greater than that of the cone-shaped end portion of the shaft.

3. A low torque motor having a shaft and a bearing member at each end thereof, each of said bearing members having a seat having a generally conical side wall and a rounded bottom surface, each of the ends of said shaft being of cone-shaped form but terminating in a rounded surface of generally spherical form and of a relatively small radius compared to that of the shaft, one of said bearing members being fixed, a resilient spider supporting the other bearing member and urging it toward the first member in a direction axially of the shaft, said spider comprising a central portion to which the bearing is secured and arms projecting outwardly and radially from said central portion, means engaging the ends of said arms to support the spider, and the included angle of the conical bearing seat being greater than that of the cone-shaped end of the shaft whereby the latter contacts the bearing only at the spherical end thereof, and the rounded bottom surface of the seat in the bearing member closely fitting the spherical end surface of the shaft, and one of said members being of softer material than the other whereby the shaft will seat itself in the bearing under pressure of the resilient spider and prevent side play of the shaft in the bearing.

References Cited in the file of this patent

UNITED STATES PATENTS

| | | |
|---|---|---|
| 2,074,711 | Taylor | Mar. 23, 1937 |
| 2,203,411 | Green | June 4, 1940 |
| 2,396,462 | Grace et al. | Mar. 12, 1946 |
| 2,427,529 | Hickok et al. | Sept. 16, 1947 |
| 2,493,999 | Riley | Jan. 10, 1950 |
| 2,615,069 | Gallagher | Oct. 21, 1952 |
| 2,646,271 | Williams | July 21, 1953 |
| 2,701,845 | Gallagher | Feb. 8, 1955 |